United States Patent

Fukuda et al.

Patent Number: 5,958,122
Date of Patent: Sep. 28, 1999

[54] PRINTING APPARATUS AND RECORDING SOLUTION

[75] Inventors: Toshio Fukuda, Kanagawa; Makoto Ando, Tokyo; Kengo Ito, Miyagi, all of Japan

[73] Assignee: Sony Corporation, Tokyo, Japan

[21] Appl. No.: 08/638,184

[22] Filed: Apr. 26, 1996

[30] Foreign Application Priority Data

Apr. 27, 1995 [JP] Japan ................................. 7-104275

[51] Int. Cl.⁶ .............................. C09D 11/02; B41J 2/17
[52] U.S. Cl. .................................. 106/31.57; 106/31.58; 106/31.85; 106/31.86; 347/84; 347/95; 347/100
[58] Field of Search ............................. 106/31.57, 31.58, 106/31.85, 31.86; 347/84, 95, 100

[56] References Cited

U.S. PATENT DOCUMENTS

| | | | |
|---|---|---|---|
| 4,109,282 | 8/1978 | Robertson et al. | 347/95 |
| 4,494,128 | 1/1985 | Vaught | 347/95 |
| 4,614,953 | 9/1986 | Lapeyre | 347/95 |
| 5,366,543 | 11/1994 | Ono et al. | 106/31.58 |
| 5,371,529 | 12/1994 | Eguchi et al. | 347/95 |
| 5,389,132 | 2/1995 | Davulcu et al. | 106/31.58 |
| 5,421,871 | 6/1995 | Onishi et al. | 106/31.58 |
| 5,441,561 | 8/1995 | Chujo et al. | 106/31.58 |

FOREIGN PATENT DOCUMENTS

| | | |
|---|---|---|
| 0 538 147 A2 | 4/1993 | European Pat. Off. . |
| 0 642 924 A2 | 3/1995 | European Pat. Off. . |
| 57-023665 | 2/1982 | Japan . |
| 63-046277 | 2/1988 | Japan . |
| 5-070727 | 5/1993 | Japan . |

OTHER PUBLICATIONS

Patent Abstracts of Japan Application No. 03261365 dated Sep. 13, 1991.

*Primary Examiner*—Helene Klemanski
*Attorney, Agent, or Firm*—Hill & Simpson

[57] ABSTRACT

A printing apparatus in which metered amounts of an ink and a diluting solution are mixed and the resulting mixed liquid is ejected to a recording medium for printing. Specifically, the ink and the dilution liquid at least containing a water-soluble organic solvent are mixed together in respective metered amounts and the resulting liquid mixture is ejected to the recording medium. The water-soluble organic solvent desirably contains the aliphatic monohydric alcohol, a polyhydric alcohol or its derivatives. The dilution liquid may contain a non-water-soluble organic solvent or a dispersion medium composed of water and a non-water-soluble resin. An OH-group containing resin and a cross-linking agent are desirably contained in the non-water-soluble resin. Ink fixing properties for a picture recorded by discharging the liquid mixture of the ink and the dilution liquid may be improved, while suppression of bleeding in the picture and improved discharging stability are also achieved.

44 Claims, 5 Drawing Sheets

PRINTING APPARATUS AND RECORDING SOLUTION

BACKGROUND OF THE INVENTION

1. Field of the Invention

This invention relates to a printing apparatus for effectuating recording by mixing metered amounts of an ink and a diluting solution and emitting the resulting mixed solution to a recording medium, and a recording solution employed for the printing apparatus. More particularly, it relates to a printing apparatus in which an organic solution or an aqueous dispersion of a resin non-soluble in water is contained in the diluting solution for improving ink fixing performance and emitting stability for prohibiting picture bleeding.

2. Description of the Related Art

Recently, document preparation by a computer, termed desk top publishing, is in widespread use especially in offices. There is also an increasing demand for outputting not only a letter or a figure but also a colored natural picture comparable to a photograph along with a letter or figure. In keeping up therewith, a demand is raised for printing a high-quality natural picture and halftone reproduction has become crucial.

A so-called on-demand printer apparatus, in which ink droplets are ejected responsive to recording signals from a nozzle only when required during printing for recording on a recording medium, such as a film, has also come into widespread use because it lends itself to reduction in size and in cost.

While a variety of methods for discharging ink droplets has been proposed, a method employing piezo-electric element or a method employing a heating element is most popular. The former method consists in applying pressure to the ink by deformation of the piezo-electric element, while the latter method consists in heating and boiling the ink by the heating element for generating bubbles for discharging the ink.

Also, a variety of methods have been proposed for regenerating the half-tone by the on-demand printing apparatus discharging the ink droplets. A first method consists in varying the voltage or pulse width of a voltage pulse applied to the piezo-electric element or the heating element for controlling the size of the ejected droplet for varying the diameter of printing dots for representing the gradation. In the above-described on-demand printing apparatus, one droplet is ejected per voltage pulse.

With this first method, if the voltage or the pulse width applied to the piezo-electric element or the heating element is lowered excessively, the ink ceases to be ejected. Consequently, there is a limitation imposed on the minimum liquid droplet diameter, while the number steps of gradation that can be represented is small and it is extremely difficult to express low density. Thus the method is not suited to print-out of a natural picture.

A second method consists in constituting a pixel by a matrix of 4×4 dots, without changing the dot diameter. The gradation is represented using a so-called dither method on the matrix basis.

If each pixel is represented by a 4×4 matrix with this second method, density may be represented by 17 steps of gradation. However, if printing is made with the same dot density as that of the first method, the resolution is lowered to one-fourth such that only coarse printing results. Thus the second method also is not suited to printout of natural pictures.

The present inventors have proposed a printing apparatus in which the ink and a diluting solution are mixed together when discharging the ink for varying the density of the ejected ink liquid droplets for controlling the density of printed dots for printing the natural picture without deteriorating the resolution. In the printer apparatus, water admixed or not admixed with surfactants is used as the dilution liquid.

Recently, an increasing demand is raised for suppressing bleeding and improving the ink fixing performance in a picture and discharging stability in a printing apparatus. Such demand cannot be met without difficulties by a printing apparatus employing water admixed or not admixed with surfactants as the above dilution liquid.

In particular, if water admixed with the surfactant is used as the dilution liquid, bleeding of an indefinite or irregular shape tends to be produced on printing on an ordinary paper sheet, thus occasionally detracting from the picture quality, even although the dilution liquid is superior in permeability to the recording medium, such as printing sheet, and hence assures ink fixation.

SUMMARY OF THE INVENTION

It is therefore an object of the present invention to provide a printing apparatus whereby bleeding in a printed picture may be prohibited and the ink fixing in a picture and eject stability in a printer apparatus may be improved further.

The present inventors have conducted perseverant researches towards achieving the above object, and found that, by employing a dilution liquid containing at least a water-soluble organic solvent, it becomes possible to improve ink fixing and suppress bleeding in the picture as well as to improve discharging stability in the printing apparatus further.

According to the present invention, there is provided a printing apparatus in which a metered amount of an ink and a metered amount of a dilution liquid are mixed together and a resulting mixed liquid is ejected onto a recording medium for recording, wherein the dilution liquid contains at least a water-soluble organic solvent.

According to the present invention, there is also provided a recording liquid used in a printing apparatus in which a metered amount of an ink and a metered amount of a dilution liquid are mixed together and a resulting mixed liquid is ejected onto a recording medium for recording, wherein the dilution liquid contains at least a water-soluble organic solvent.

In the printing apparatus or the recording liquid according to the present invention, the amount of the water-soluble organic solvent in the dilution liquid is preferably not less than 1 wt %.

The water-soluble organic solvents may be enumerated by lower alcohols, such as methyl alcohol, ethyl alcohol, n-propyl alcohol or n-butyl alcohol, alcohol amines, such as monoethanol amine, diethanol amine or triethanol amine, ketones, such as acetone or methylethylketone, amides, such as dimethylamide or dimethylacetoamide, ethers such as dioxane, alkylene glycols, such as ethylene glycol, propylene glycol, butylene glycol, triethylene glycol or thiodiglycol, polyalkylene glycols, such as polyethylene glycol or polypropyrene glycol, lower alkyl ethers of polyhydric alcohols, such as ethylene glycol dimethylether or diethylene glycol monomethylether, and glycerin.

Also, as a result of our perseverant researches, the present inventors have found that, if the water-soluble organic solvent contains the aliphatic monohydric alcohol, it becomes possible to improve permeability of the dilution liquid to the recording medium, such as a printing paper, or drying properties of the produced picture.

That is, in the printing apparatus or the recording liquid according to the present invention, an aliphatic monohydric alcohol may be contained in the water-soluble organic solvent. As the aliphatic monohydric alcohol, ethyl alcohol, isopropyl alcohol and n-butyl alcohol are thought to be preferred. Of these, isopropyl alcohol is desirable in that it exhibits moderate dryness as compared to other alcohols, emits less odor and is capable of raising dot-forming performance.

Likewise, as a result of our perseverant researches, the present inventors have found that, if a polyhydric alcohol or its derivative is contained in the water-soluble organic solvent, it becomes possible to prohibit stuffing of the printing apparatus and to improve preservability of the dilution liquid.

That is, in the printing apparatus or the recording liquid according to the present invention, a polyhydric alcohol or its derivative may also be contained as the water-soluble organic solvent. Among the derivatives of the polyhydric alcohols, alkyl ether derivatives of the polyhydric alcohols, that are hygroscopic high-melting solvents, are highly effective in prohibiting stuffing of the printing apparatus. In addition, diethylene glycol and glycerin are highly effective in improving preservability of the dilution liquid since these compounds prove optimum solvents for ink dyes and have the effect of lowering the freezing point of water.

In the printing apparatus or the recording liquid according to the present invention, at least one of the surfactant, viscosity adjustment agent, anti-foaming agent, antiseptics or the pH adjustment agent may be contained in the dilution liquid.

The surfactants may be enumerated by anionic surfactants, such as alkyl sulfates or alkyl ether sulfates, polyoxyethylene alkylethers or polyoxyethylene fatty acid esters. These surfactants may be used appropriately depending upon usage and application. The amount of addition of the surfactant is desirably 0.01 to 50 wt % based on the total weight of the dilution liquid, depending upon the composition of the dilution liquid and the surfactant structure. The pH adjustment agent may be suitably selected so that a pH value will be on the order of 7.0 to 11. The pH value of the ink affects the portion it contacts, in other words, the stability of the ink itself. This it is desirable to adjust the pH value to the above range by the pH adjustment agent.

Similarly, as a result of our perseverant researches, the present inventors have found that, if a water-insoluble organic solvent or a dispersion medium composed of water and a non-water-soluble resin is used as a dilution liquid, it becomes possible to improve ink fixing properties and to suppress bleeding in a picture as well as to improve discharging stability in the printing apparatus.

Thus, there is provided, according to the present invention, a printing apparatus in which a metered amount of an ink and a metered amount of a dilution liquid are mixed together and a resulting mixed liquid is ejected onto a recording medium for recording, wherein the dilution liquid contains a non-water-soluble organic solvent or a dispersion medium composed of water and a water-insoluble resin.

There is also provided, according to the present invention, a dilution liquid used in a printing apparatus in which a metered amount of an ink and a metered amount of a dilution liquid are mixed together and a resulting mixed liquid is ejected onto a recording medium for recording, wherein the dilution liquid contains a water-insoluble organic solvent or a dispersion medium composed of water and a water-insoluble resin.

In the printing apparatus or the recording liquid according to the present invention, the dispersion medium preferably contains a surfactant.

In the printing apparatus or the recording liquid according to the present invention, a fatty acid glycerin ester is preferably contained as a water-insoluble organic solvent.

In the printing apparatus or the recording liquid according to the present invention, the water-insoluble resin in the dilution liquid preferably contains a resin containing an active OH-group.

In the printing apparatus or the recording liquid according to the present invention, a resin rendered transparent after film formation on a recording medium and having a pencil hardness as prescribed in pencil scratch strength test according to JIS K5400 of not less than B may be contained in the water-insoluble resin in the dilution liquid.

In the printing apparatus or the recording liquid according to the present invention, a cross-linking agent inert to a dilution liquid containing water and a non-water-soluble resin may also be contained in the dilution liquid.

The cross-linking agent is preferably a dialdehyde, its derivatives or an isocyanate derivative having a protected reactive group.

Further, in the printing apparatus or the recording liquid according to the present invention, an ultra-violet absorber or a fluorescent whitening agent may also be contained in the dilution liquid. The ink may also be an oily dye.

According to the present invention, there is additionally provided a printing apparatus in which a metered amount of an ink and a metered amount of a dilution liquid are mixed together and a resulting mixed liquid is ejected onto a recording medium for recording, wherein the dilution liquid contains at least the water-soluble organic solvent.

If the water-soluble organic solvent contains an aliphatic monohydric alcohol, picture fixing, that is ink fixing, may be improved since the aliphatic monohydric alcohol has the function of providing uniform bleeding and enhancing the ability of evaporation and the ability of permeation of the mixing liquid to the recording paper.

If the water-soluble organic solvent contains polyhydric alcohol, in particular an alkyl ether derivative of polyhydric alcohol, the stuffed state of the printing apparatus may be resolved since the alkyl ether derivative is a hygroscopic high-melting solvent. If the water-soluble organic solvent contains diethylene glycol or glycerin, the solvent functions as an excellent solvent for the ink dye and improves preservability of the dilution liquid by its effect in lowering the freezing point of water.

If, in the printing apparatus of the present invention, the dilution liquid contains the water-insoluble organic solvent or a dispersion medium composed of water and a water-insoluble resin, it becomes possible to suppress bleeding and to improve ink fixation in the picture and discharging stability in the printing apparatus.

If a resin containing an active OH-group in the non-water-soluble resin is contained in the dilution liquid, cross-linking is produced on the picture formed by the mixing liquid, thus improving water-proofness and anti-frictional properties of the produced picture.

If the cross-linking agent is contained in the dilution liquid, resin cross-linking on the picture produced by the mixed liquid is promoted for further improving water-proofness and anti-frictional properties of the produced picture.

DESCRIPTION OF PREFERRED EMBODIMENTS

The present invention will now be explained with reference to preferred illustrative embodiments based on experimental results.

First, a printing apparatus of the present embodiment is explained. The printing apparatus of the present embodiment is an on-demand printing apparatus or a so-called carrier jet printing apparatus in which the ink and the dilution liquid are provided on the metering side and on the eject side, respectively, and the mixed liquid composed of the ink and the dilution liquid is ejected on the recording paper or the like. In the present embodiment, a pressure-sensitive element, such as a piezo-electric element, is employed as metering means for the ink or the dilution liquid.

Figure 1:
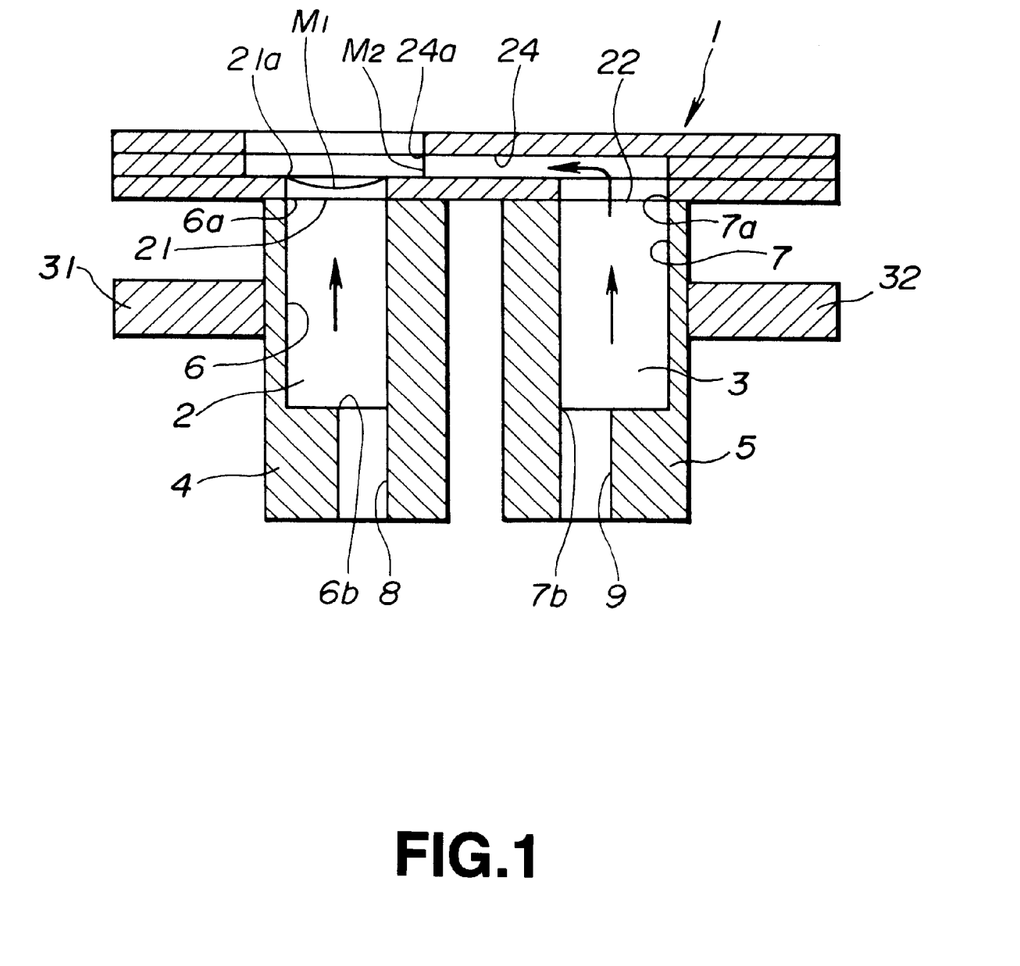
FIG. 1 is a schematic cross-sectional view showing essential portions of a printing apparatus according to the present invention.

The printing apparatus of the instant embodiment is comprised of an orifice plate 1 having a nozzle, a first liquid reservoir 4 charged with a first liquid 2 and a second reservoir 5 charged with a second liquid 3, as shown in FIG. 1.

Figure 2:
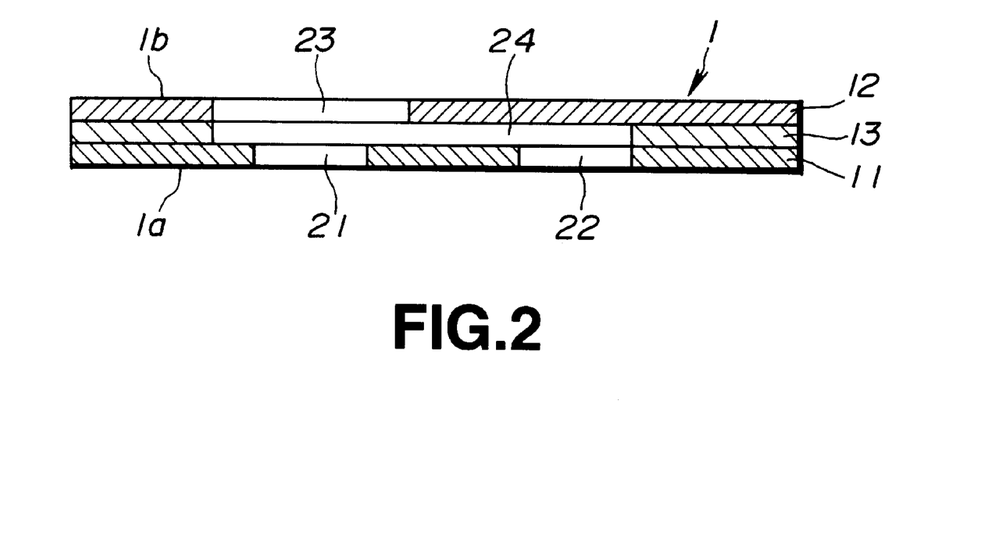
FIG. 2 is a schematic cross-sectional view showing essential portions of an orifice plate of the printing apparatus of FIG. 1 to an enlarged scale.

The orifice plate 1 has a layered structure comprised of a first plate 11, a second plate 12 and a third plate 13, with the third plate 13 being sandwiched in the direction of thickness between the first plate 11 and the second plate 12, as shown in FIG. 2.

The first plate 11, in other words, a surface 1a of the layered plate, is formed with first and second supply ports 21, 22, while the second plate 12, in other words, the other surface 1b of the layered plate, is formed with a nozzle 23 for discharging a mixed liquid composed of the two liquids supplied via first and second ports 21, 22.

The third plate 13 is provided between the first plate 11 and the second plate 12. This third plate 13 is formed of a dry film resist and has a channel 24 extending along the inner surface of the plate. The channel 24 is connected with the first and second supply ports 21, 22 and the nozzle 23.

The nozzle 23 is formed in register with the first supply port 21 as a circular through-hole having a diameter larger than the diameter of the fist supply port 21. Although the nozzle 23 is preferably larger in diameter than the first nozzle 21, it may also be of the same diameter as the first nozzle. Similarly to the first and second supply ports 21, 22, the nozzle 23 may also be elliptical or rectangular instead of being circular in shape.

Figure 3:
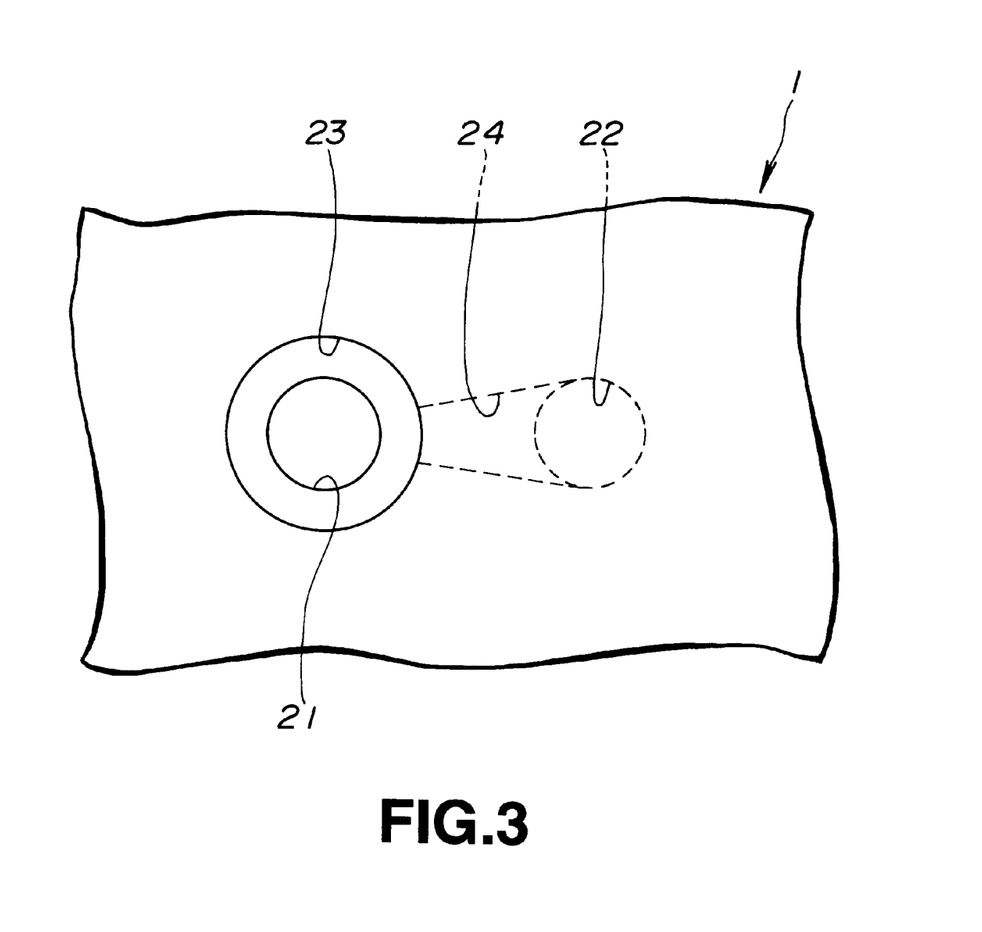
FIG. 3 is a schematic plan view showing essential portions of an orifice plate of the printing apparatus of FIG. 1 to an enlarged scale.

The channel 24 is tapered from the second supply port 22 not in register with the nozzle 23 towards the nozzle 23, as shown in FIG. 3. However, the nozzle 23 may also be of the same diameter.

The first and second liquid reservoirs 4 and 5, connected to the orifice plate 1, are explained.

The liquid reservoir 4 is a vessel having a substantially box-shaped hollow portion 6, as shown in FIG. 1. The upper surface of the hollow portion 6 is defined by an opening 6a communicating with the first supply port 21 of the orifice plate 1. The second liquid reservoir 5 is also a vessel having a substantially box-shaped hollow portion 7, with the upper surface of the hollow portion 7 being defined by an opening 7a communicating with the second supply port 22.

The first liquid reservoir 4 has a bottom 6b opposite to the opening 6a of the hollow portion 6 of the liquid reservoir 4. The bottom 6b is formed with a thorough-hole 8 communicating with the hollow portion 6 and with the outside. The second liquid reservoir 5 also has a bottom 7b opposite to the opening 7a. The bottom 7b is formed with a thorough-hole 9 communicating with the hollow portion 6 and with the outside.

Thus, with the printing apparatus of the present embodiment, the through-hole 8, hollow portion 6 and the first supply port 21 communicate with one another to constitute a through-hole charged with the dilution liquid as the first solution 2. Similarly, the through-hole 9, hollow portion 7, the second supply port 22 and the channel 24 communicate with one another to constitute a through-hole charged with ink as the second solution 3.

The first and second liquid reservoirs 4, 5 are fitted with piezo-electric elements 31, 32, respectively. These piezo-electric elements 31, 32 are deformed by electric signals supplied thereto for changing the pressure within the liquid reservoirs 4 and 5.

With the printing apparatus of the present embodiment, employing the piezoelectric elements 31, 32, the mixing ratio of the second liquid 3 contained in the mixing liquid, that is the ink density, may be adjusted by adjusting the voltage pulses supplied to the elements 31, 32.

For printing by the above-described printing device, the second liquid 3, which is the ink supplied from the second supply port 22, is charged into the channel 24 under the capillary tube phenomenon for forming a second meniscus M2 at a distal end 24a of the channel 24, while a first meniscus M1 by the first liquid 2 which is the dilution liquid supplied from the first supply port 21 is formed at a distal end 21a of the first supply port 21 by the capillary tube phenomenon, as shown in FIG. 1.

Figure 4:
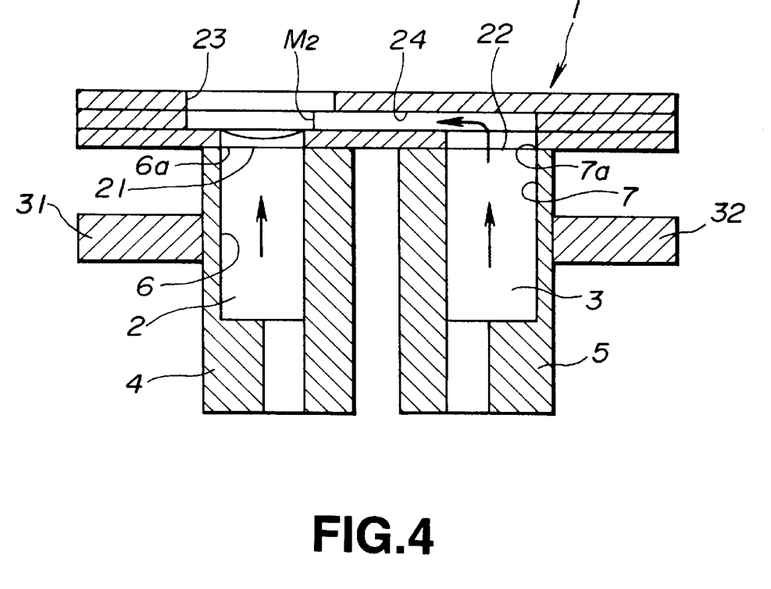
FIG. 4 is a schematic cross-sectional view sequentially showing the operation of the printing apparatus shown in FIG. 1, and showing the state in which a meniscus is being formed in the orifice plate.

A voltage pulse is then applied to the piezo-electric element 32 provided in the second liquid reservoir 5 charged with the second liquid 3 for applying a pressure to the second liquid reservoir 5 for raising the pressure within the hollow portion 7 and a pressure P2 in the channel 24. As a result, the second meniscus M2 of the second liquid 3 is moved towards the nozzle 23 operating as a mixing chamber thus extruding the second liquid 3 into the nozzle 23. The extruded amount of the second liquid 3 is controlled at this time by the value of the pressure exerted by the piezoelectric element 32 to the second liquid reservoir 5 and by the voltage value or pulse width of the voltage pulse supplied to the piezo-electric element 32.

Figure 5:
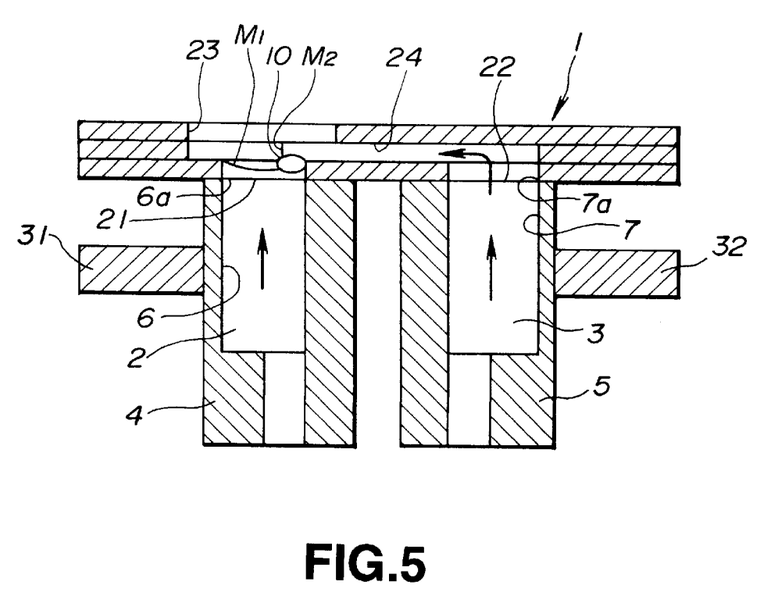
FIG. 5 is a schematic cross-sectional view sequentially showing the operation of the printing apparatus shown in FIG. 1, and showing the state in which a second meniscus has touched the first meniscus.

By adjusting the amount of rise and the rise duration of the pressure P2, the second meniscus M2 is contacted with the first meniscus M1 of the first liquid 2 within the nozzle 32, as a result of which a mixed liquid 10 composed of the first liquid 2 and the second liquid 3 is generated in the nozzle 23.

Figure 6:
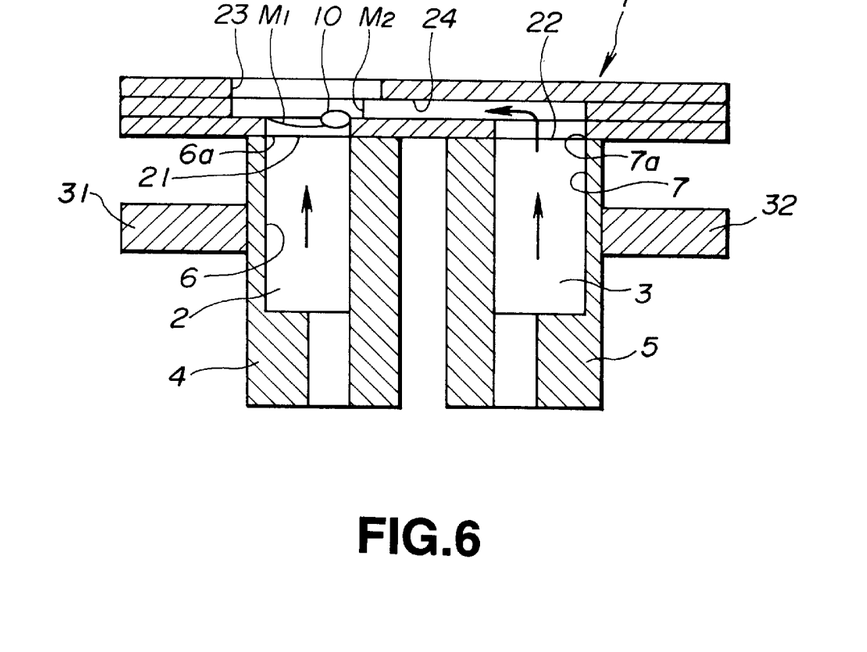
FIG. 6 is a schematic cross-sectional view sequentially showing the operation of the printing apparatus shown in FIG. 1, and showing the state in which the second meniscus has been receded and separated away from the first liquid.
Figure 7:
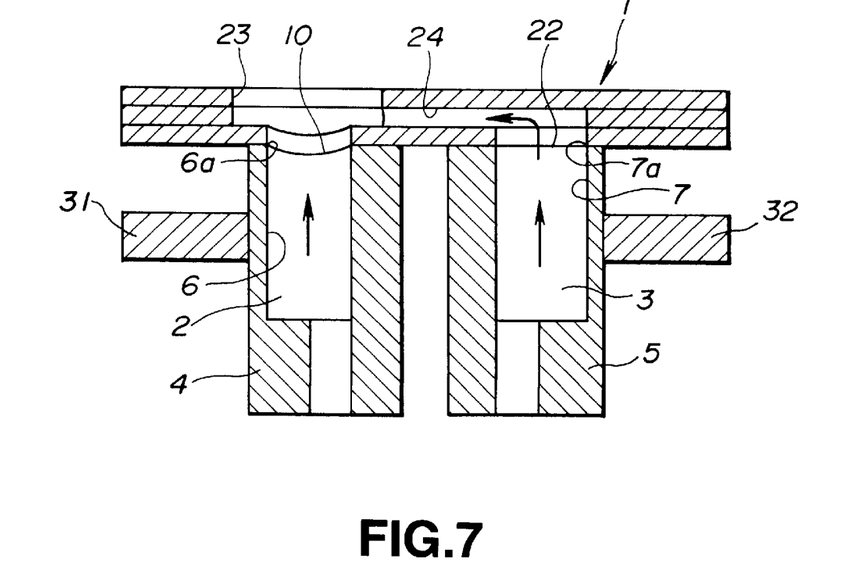
FIG. 7 is a schematic cross-sectional view sequentially showing the operation of the printing apparatus shown in FIG. 1, and showing the state in which a mixed liquid has been formed within the nozzle.

The voltage pulse supplied to the piezoelectric element 32 provided in the second liquid reservoir 5 is reset to an original value. If there is no pressure rise of the second liquid 3 in the channel 24, the second meniscus M2 of the second liquid 3 is stable if it is present at a position out of contact with the first meniscus M1 of the first liquid 2. Thus the second meniscus M1 is receded towards the channel 24, away from the first liquid 2, and is ultimately formed at the distal end 24a of the channel 24, as shown in FIG. 6. The mixed liquid 10, having an intermediate density, is formed within the nozzle 23, as shown in FIG. 7.

By further increasing the rise amount and rise duration of the pressure P2 of the second liquid 3, that is the voltage value or the pulse width of the voltage pulse supplied to the piezo-electric element 32, the mixing ratio of the second liquid 3 in the mixed liquid 10, that is the ink density, may be increased. That is, the mixing ratio of the generated mixed liquid 10, that is the ink density, is adjusted by the amount and duration of rise in pressure P2, that is the voltage value or the pulse width of the voltage pulse supplied to the piezo-electric element 32.

Figure 8:
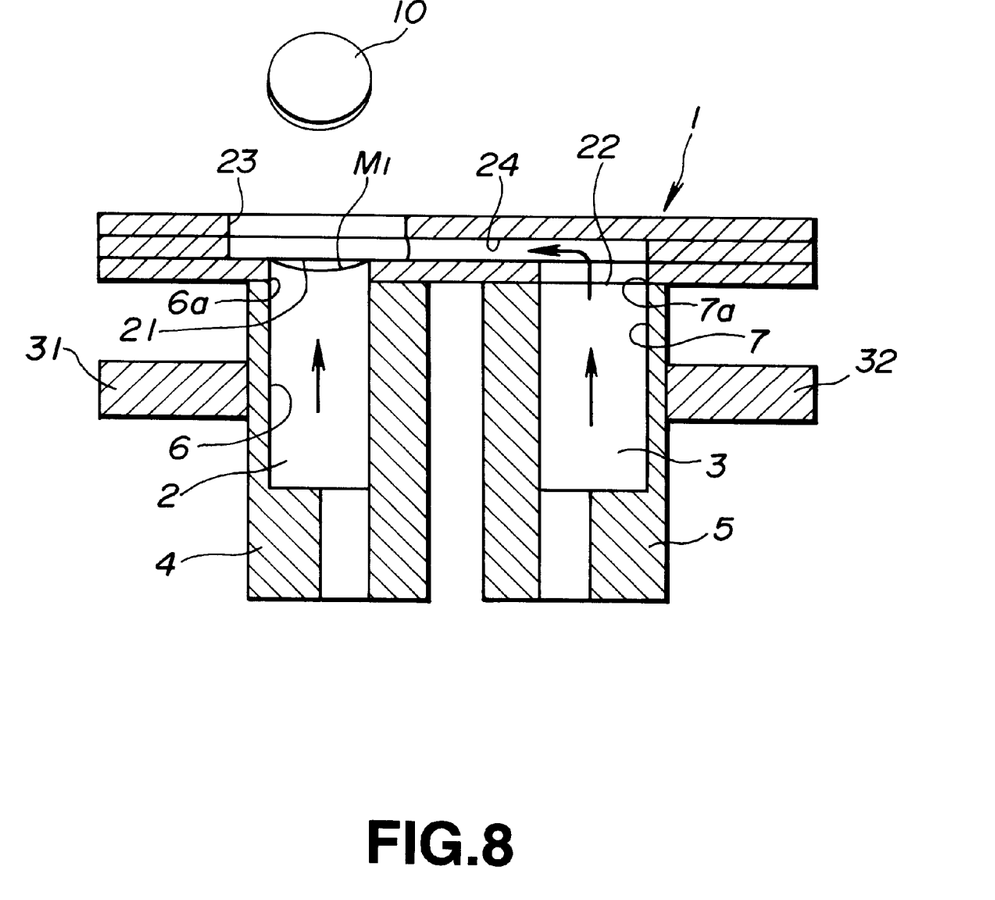
FIG. 8 is a schematic cross-sectional view sequentially showing the operation of the printing apparatus shown in FIG. 1, and showing the state in which the mixed liquid has been ejected.

A voltage pulse is then supplied to the piezo-electric element 31 provided on the first liquid reservoir 4 charged with the first liquid 2 for exerting the pressure to the first liquid reservoir 4 for raising the pressure in the hollow portion 6 and a pressure P1 in the first supply port 21. This moves the mixed liquid 10 towards the nozzle 23. If now the pressure P1 in the first supply port 21, that is the pressure of the first liquid 2, is increased, the mixed liquid 10 is ejected to atmosphere via nozzle 23, as shown in FIG. 8, so as to be deposited on a recording sheet, not shown, as a recording medium, provided facing the nozzle 23. The first meniscus M1 is newly formed in the first supply port 21 supplied with the first liquid 2. In the printing device, a droplet of the mixed liquid is ejected per a voltage pulse operating as a pressure pulse of exerting the pressure.

The above-described sequence of operations in the printing apparatus is merely exemplary and the timing or the state of each operation, such as the shape or the charging operation of the mixed liquid, are varied by structural factors, such as size of the supply ports or nozzles, physical factors, such as viscosity or surface tension of the ink or the dilution liquids or the operating conditions, such as the eject frequency.

In the above printing apparatus, gradation may be manifested by adjusting the rise amount and rise duration of the pressure P2 of the second liquid 3 as the ink, that is the voltage value or the pulse width of the voltage pulse supplied to the piezoelectric element 32, for adjusting the mixing ratio of the second liquid 3 contained in the mixed liquid 10, that is the ink density.

Although the above description has been made of a printing apparatus employing a piezo-electric element for metering the ink or the dilution liquid, the present invention may be applied to a printing apparatus in which a heating element is employed for this purpose.

Picture recording was made using a variety of dilution liquids and the above printing apparatus for investigating into picture characteristics.

EXPERIMENTAL EXAMPLE 1

In the present experimental example, ink fixing properties, occurrence of bleeding and eject stability at the time of discharging in case the picture was formed using an ink at least containing the water-soluble organic solvent were checked.

First, the diluting liquid was prepared. That is, dilution liquids of samples 1 to 3 having the compositions shown in Table 1 were prepared and a dilution liquid composed only of water was prepared as a comparative sample. As a surfactant, nonionic surfactant manufactured and sold by DAIICHI KOGYO SEIYAKU CO. LTD. under the trade name of PEG400 was employed.

TABLE 1

| | water-soluble organic solvent | | | | | | | | | |
|---|---|---|---|---|---|---|---|---|---|---|
| | aliphatic monohydric alcohol | | polyhydric alcohol | | | | polyhyd. alcohol deriv. | others | | |
| | ethyl alcohol | isopropyl alcohol | ethylene glycol | diethlene glycol | glycerin | triethanol amine | ethylene glycol monoethyl ether | N,N-dimethyl formamide | water | surfactant |
| inv. sample 1 | 100 | — | — | — | — | — | — | — | — | — |
| inv. sample 2 | — | 1 | — | — | — | — | — | — | 99 | — |
| inv. sample 3 | — | — | 100 | — | — | — | — | — | — | — |
| inv. sample 4 | — | — | — | 1 | — | — | — | — | 99 | — |
| inv. sample 5 | — | 50 | — | 50 | — | — | — | — | — | — |
| inv. sample 6 | — | 10 | — | 10 | — | — | — | — | 80 | — |
| inv. sample 7 | 5 | — | — | 20 | — | — | — | — | 74 | 1 |
| inv. sample 8 | — | 5 | — | 15 | 5 | — | — | — | 74.9 | 0.1 |
| inv. sample 9 | — | — | — | — | — | — | 1 | — | 99 | — |
| inv. sample 10 | — | — | — | — | — | 1 | — | — | 99 | — |

TABLE 1-continued

| | water-soluble organic solvent | | | | | | | | | |
|---|---|---|---|---|---|---|---|---|---|---|
| | aliphatic monohydric alcohol | | polyhydric alcohol | | | | polyhyd. alcohol deriv. | others | | |
| | ethyl alcohol | isopropyl alcohol | ethylene glycol | diethlene glycol | glycerin | triethanol amine | ethylene glycol monoethyl ether | N,N-dimethyl formamide | water | surfactant |
| inv. sample 11 | — | — | — | — | — | 45 | — | — | 55 | — |
| inv. sample 12 | — | — | — | — | — | — | — | 1 | 99 | — |
| inv. sample 13 | — | 5 | — | 20 | — | 2 | — | — | 72.9 | 0.1 |

The ink was then prepared. From the ink cartridges of a printing apparatus produced by HEWLETT PACKARD INC. under the trade name of DESKJET1200C, inks of respective colors of yellow (Y), magenta (M) and cyan (C) were taken out as an ink sample 1. Then, from the ink cartridges of a printing apparatus produced by EPSOM INC. under the trade name of MJ-700V2C, inks of respective colors of Y, M and C were taken out as ink sample 2.

Using inventive samples 1 to 13 and the comparative sample as the dilution liquids, and also using the ink samples 1 and 2 as inks, pictures of the above colors were formed by the above printing apparatus for checking into ink fixation properties, occurrence of bleeding and eject stability at the time of discharging.

The ink fixation properties were checked by printing a letter as a picture on a marketed copy sheet, rubbing the printed letter with the same copy sheet at pre-set time intervals and measuring the time which elapsed until tailing of the mixed liquid constituting the letter disappears and the paper sheet is no longer contaminated. This time becomes shorter if the drying properties of the mixed liquid and permeability into the recording sheet are satisfactory. The result is represented as ○, Δ and × if the above time is within 15 seconds, 15 to 30 seconds and longer than 30 seconds, respectively.

The occurrence of bleeding was checked by observing the dots constituting the printed letter with naked eyes and over a microscope with a multiplication ratio of 100. The result is represented as ○, Δ and × if no bleeding due to paper fibers occurred and the dot has been formed on the paper sheet, if bleeding due to paper fibers has occurred and if bleeding has occurred to a significant extent and dots cannot be identified, respectively.

The eject stability was checked by continuously printing patterns by solid printing, in addition to printing of letters, using the above printing apparatus, and printing troubles, such as disturbed printing or failure in discharging, were checked. The result was represented as ○, Δ and × if there is no printing trouble, if printing trouble occurred from time to time in the course of continuous discharging and if disturbed printing occurred significantly from the outset of printing, respectively.

The results are shown in Tables 2 and 3, showing the result in case of using the ink sample 1 and showing the result in case of using the ink sample 2, respectively.

TABLE 2

| | ink fixing | | | bleeding | | | disch. stability | | | overall |
|---|---|---|---|---|---|---|---|---|---|---|
| | Y | M | C | Y | M | C | Y | M | C | evaluation |
| inv. sample 1 | ○ | ○ | ○ | ○ | ○ | ○ | ○ | ○ | ○ | ○ |
| inv. sample 2 | × | × | × | ○ | ○ | ○ | Δ | Δ | Δ | Δ |
| inv. sample 3 | × | × | × | ○ | ○ | ○ | ○ | ○ | ○ | Δ |
| inv. sample 4 | × | × | × | ○ | ○ | ○ | Δ | Δ | Δ | Δ |
| inv. sample 5 | Δ | Δ | Δ | ○ | ○ | ○ | ○ | ○ | ○ | ○ |
| inv. sample 6 | ○ | ○ | ○ | ○ | ○ | ○ | ○ | ○ | ○ | ○ |
| inv. sample 7 | ○ | ○ | ○ | ○ | ○ | ○ | ○ | ○ | ○ | ○ |
| inv. sample 8 | ○ | ○ | ○ | ○ | ○ | ○ | ○ | ○ | ○ | ○ |
| inv. sample 9 | × | × | × | ○ | ○ | ○ | Δ | Δ | Δ | Δ |
| inv. sample 10 | × | × | × | ○ | ○ | ○ | Δ | Δ | Δ | Δ |
| inv. sample 11 | Δ | Δ | Δ | ○ | ○ | ○ | ○ | ○ | ○ | ○ |
| inv. sample 12 | × | × | × | ○ | ○ | ○ | Δ | Δ | Δ | Δ |
| inv. sample 13 | ○ | ○ | ○ | ○ | ○ | ○ | ○ | ○ | ○ | ○ |
| comp. sample | × | × | × | × | × | × | Δ | Δ | Δ | × |

TABLE 3

| | ink fixing | | | bleeding | | | disch. stability | | |
|---|---|---|---|---|---|---|---|---|---|
| | Y | M | C | Y | M | C | Y | M | C |
| inv. sample 1 | ○ | ○ | ○ | ○ | ○ | ○ | ○ | ○ | ○ |
| inv. sample 2 | × | × | × | ○ | ○ | ○ | Δ | Δ | Δ |
| inv. sample 3 | × | × | × | ○ | ○ | ○ | ○ | ○ | ○ |
| inv. sample 4 | × | × | × | ○ | ○ | ○ | Δ | Δ | Δ |
| inv. sample 5 | Δ | Δ | Δ | ○ | ○ | ○ | ○ | ○ | ○ |
| inv. sample 6 | ○ | ○ | ○ | ○ | ○ | ○ | ○ | ○ | ○ |
| inv. sample 7 | ○ | ○ | ○ | ○ | ○ | ○ | ○ | ○ | ○ |
| inv. sample 8 | ○ | ○ | ○ | ○ | ○ | ○ | ○ | ○ | ○ |
| inv. sample 9 | × | × | × | ○ | ○ | ○ | Δ | Δ | Δ |
| inv. sample 10 | × | × | × | ○ | ○ | ○ | Δ | Δ | Δ |
| inv. sample 11 | ○ | ○ | ○ | ○ | ○ | ○ | ○ | ○ | ○ |
| inv. sample 12 | ○ | ○ | ○ | ○ | ○ | ○ | ○ | ○ | ○ |
| inv. sample 13 | ○ | ○ | ○ | ○ | ○ | ○ | ○ | ○ | ○ |
| comp. sample | × | × | × | × | × | × | Δ | Δ | Δ |

In the above Table 2, the results of evaluation on pictures printed using respective inks and the respective dilution liquids and the results of overall evaluation taking into account the preservability of the dilution liquids are also shown. The overall evaluation is given in four stages, so that ⊙, ○, Δ and × indicate a satisfactory picture and good preservability of the dilution liquid, a satisfactory picture and inferior preservability of the dilution liquid, practically acceptable picture and practically unacceptable picture, respectively.

It is seen from the results of Tables 1, 2 and 3 that, if the dilution liquids of the inventive samples 1 to 13 containing at least the water-soluble organic solvent, it becomes possible to produce pictures more satisfactory in respective properties without regard to the ink types than if the dilution liquid of the comparative sample composed only of water is used, and that the eject stability at the time of discharging is also satisfactory. Although it is seen from Tables 2 and 3 that similar results are obtained with the use of the dilution liquids of the inventive samples and of the dilution liquid of the comparative sample, it has been confirmed that the dilution liquids of the inventive samples are practically more desirable.

It has also been conformed from the results of Tables 1, 2 and 3 that, in the diluting solutions of the inventive samples 2, 4, 9, 10 and 12, containing relatively small amounts of the water-soluble organic solvents, the effect of the water-soluble organic solvents is low, while ink fixing properties and discharging stability pose no practical problems, but are only slightly insufficient. In the inventive sample 9, the stuffed state of the printing apparatus was found to have been resolved. On the other hand, in dilution solutions of the inventive samples 5, 6, 7, 8, 11 and 13, in which the water-soluble organic solvents are contained in moderate amounts, the effect of the water-soluble organic solvent is high and picture characteristics as well as discharging stability is generally satisfactory.

It has also been found that, if the dilution liquid is composed only of the water-soluble organic solvents, as in inventive samples 1 and 3, volatility is excessively high as in the inventive sample 1, thus testifying to slightly insufficient characteristics.

Thus it has been found that the content of the water-soluble organic solvent in the dilution liquid be desirably on the order of 5 to 10 wt %. If aliphatic monohydric alcohol is used as the water-soluble organic solvent, the dilution liquid becomes excessively high in volatility thus impairing its preservability. If polyhydric alcohol or its derivative is used as the water-soluble organic solvent, the dilution liquid becomes low in drying properties for the amount of the water-soluble organic solvent exceeding 50 wt %, thus impairing ink fixation properties.

That is, if the dilution liquid for the printing apparatus of the present embodiment containing at least the water-soluble organic solvent is used, and the water-soluble organic solvent contains a moderate amount of the aliphatic monohydric alcohol, picture fixing properties, in other, words, the ink fixing properties, is improved without lowering picture quality, since the aliphatic monohydric alcohol assures uniform bleeding and improves the ability of evaporation and permeation of the mixed liquid to the recording paper, thus providing a high-quality picture.

If the water-soluble organic solvent contains a moderate amount of polyhydric alcohol, in particular, alkyl ether derivatives of the polyhydric alcohol, the stuffed state of the printing apparatus is resolved and a high-quality picture may be realized, since the alkyl ether derivative is a hygroscopic high-melting solvent. If the water-soluble organic solvent contains diethylene glycol and glycerin, the dilution liquid is improved in preservability and a high-quality picture is formed, since these operate as an excellent solvent for ink dyes and has the effect of lowering the freezing point of water.

It should be noted that similar effects may be achieved by using a dilution liquid containing at least one of the viscosity adjustment agent, anti-foaming agent, antiseptics and pH adjustment agent for the inventive samples of the above experimental example.

EXPERIMENTAL EXAMPLE 2

In the present Experimental Example, ink fixing properties, occurrence of bleeding and discharging stability at the time of discharging were checked in case a picture was formed using a dilution liquid containing a water-insoluble organic solvent or a dispersant composed of water and a water-insoluble resin.

First, a dilution liquid was prepared. 100 parts of fatty acid triglyceride, which is a water-insoluble organic solvent, manufactured by RIKEN VITAMIN CO. LTD. under the trade name of Richemal, were prepared and used as inventive sample 14.

1 part of butyral, which is a non-water-soluble resin containing an active OH-group, manufactured by SEKISUI KAGAKU CO. LTD. under the trade name of KX-5, 60 parts of water and 2 parts of non-ionic surfactant, manufactured by DAIICHI KOGYO CO. LTD. under the trade name of PEG300, were agitated for ten hours, using a homogenizer, for producing a dispersant as inventive sample 15.

To 100 parts of the dispersant of the inventive sample 15, 1 part of a 40 wt % aqueous solution of glioxysal, as a cross-linking agent and 1 part of a 1N aqueous solution of HCl were added to give an inventive sample 16.

Also, to 60 parts of a commercially available aqueous dispersion of polyurethane, manufactured by DAIICHI KOGYO SEIYAKU CO. LTD. under the trade name of Superflex 110, as a dispersion medium, 9 parts of a block isocyanate manufactured by DAIICHI SEIYAKU CO. LTD. under the trade name of Elastron BN-11, as a cross-linking agent, to give an inventive sample 17.

In addition, 100 parts of a commercially available polyester dispersion, manufactured by TOYOBO CO. LTD. under the trade name of Byronal MD-1200, as a dispersion medium, were prepared as an inventive sample 18.

In the present experimental example, a dilution liquid composed only of water was prepared as a comparative sample.

The ink was then provided. Specifically, Basic Blue 3 was formed into a salt with sodium lauryl sulfate to prepare an oily dye and 10 parts of the oily dye and 90 parts of acetone were mixed to provide an ink sample 3.

Then, using the inventive samples 14 to 18 and the comparative sample as the dilution liquid, and also using the ink sample 3 as the ink, a picture was prepared as in Experimental Example 1. The picture was checked as to ink fixing properties, occurrence of bleeding and discharging stability at the time of discharging in the same way as in Experimental Example 1. The comprehensive evaluation was also made. Meanwhile, the ink color is only the cyan. The results are shown in Table 4.

TABLE 4

|  | ink fixing | bleeding | disch. stability | overall evaluation |
| --- | --- | --- | --- | --- |
| inventive sample 14 | x | Δ | ○ | Δ |
| inventive sample 15 | x | ○ | ○ | Δ |
| inventive sample 16 | ○ | ○ | ○ | ○ |
| inventive sample 17 | ○ | ○ | ○ | ○ |
| inventive sample 18 | Δ | ○ | ○ | ○ |
| comp. sample | x | x | x | x |

It is seen from the results of Table 4 that, if dilution liquids of the inventive samples 14 to 18 containing a dispersion medium composed of water and the non-water-soluble resin are used, a picture having characteristics better than those in case of using the conventional dilution liquid composed only of water is provided, while discharging stability at the time of discharging is also improved. Although it is seen from Table 4 that similar results are obtained with the use of the dilution liquids of the inventive samples and of the dilution liquid of the comparative sample, it has been confirmed that the dilution liquids of the inventive samples are practically more desirable.

It is also seen from the results of Table 4 that, with the inventive sample 14 composed only of the non-water-soluble organic solvent or the inventive samples 15 and 18 composed only of the dispersion medium, ink fixing properties and discharging stability pose no practical problems, but are only slightly insufficient.

It is also seen that, with the inventive samples 16 and 17 of the dilution liquid admixed with a cross-linking agent, in which cross-linking occurs on the picture, a picture may be produced in which ink fixing properties and durability are further raised, while bleeding is prohibited further. It has been conformed that improved ink fixing properties also represent improved anti-frictional properties such that cross-linking has led to improved anti-frictional properties.

Consequently, if a dilution liquid containing a non-water-soluble organic solvent or a dispersion medium composed of water and the non-water-soluble resin is used in the printing apparatus of the present embodiment, improved ink fixing properties and suppression of bleeding may be achieved in the picture, while discharging stability may be assured in the printing apparatus, thus assuring the high picture quality.

If the resin having active OH-groups in the non-water-soluble resin is contained in the non-water-soluble resin, cross-linking of the resin occurs on the picture for further improving water-proofness and anti-frictional properties of the produced picture.

If a dilution liquid containing an UV absorber or a fluorescent whitening agent is used in the inventive samples discussed in the above experimental example, similar results may also be achieved.

The present invention resides in that, in a printing apparatus in which the ink and the dilution liquid are mixed together in pre-set metered amounts and the resulting mixed liquid is ejected onto a recording medium for recording, the dilution liquid contains at least a water-soluble organic solvent.

If the water-soluble organic solvent contains polyhydric alcohol, especially an alkyl ether derivative of polyhydric alcohol, the stuffed state of the printing apparatus may be resolved and a high-quality picture may be produced since the alkyl ether derivative is a hygroscopic high-melting solvent. If the water-soluble organic solvent contains diethylene glycol or glycerin, it operates as an excellent solvent for ink dye. In addition, the dilution liquid is improved in preservability due to the effect of the solvent in lowering the freezing point of water, thus realizing the high picture quality.

If, in the printing apparatus of the present invention, the dilution liquid contains the water-insoluble organic solvent or a dispersion medium composed of water and the water-insoluble resin, improved ink fixing properties and suppression of bleeding in a picture and improved discharging stability in the printing apparatus may be achieved, thus enabling a picture of high quality to be produced.

If a resin containing an active OH-group is contained as the water-insoluble resin, cross-linking occurs on a picture formed by the mixed liquid, thus improving water-proofness and anti-frictional properties of the produced picture.

If a cross-lining agent is contained in the dilution liquid, cross-linking on the picture formed by the mixed liquid is promoted for further improving water-proofness and anti-frictional properties.

What is claimed is:

1. A printing apparatus in which an ink and a dilution liquid are mixed together and a resulting mixed liquid is ejected onto a recording medium for recording, wherein:
   said dilution liquid contains at least a water-soluble organic solvent and water;
   said dilution liquid is dye free; and
   said water-soluble organic solvent is selected from the group consisting of lower alcohols alcohol amines, ketones, amides, ethers alkylene glycols, polyalkylene glycols, and lower alkyl ethers of polyhydric alcohols, and glycerin.

2. The printing apparatus as claimed in claim 1 wherein the amount of the water-soluble organic solvent in the dilution liquid is not less than 1 wt %.

3. The printing apparatus as claimed in claim 1 wherein said water-soluble organic solvent is an aliphatic monohydric alcohol.

4. The printing apparatus as claimed in claim 3 wherein said aliphatic monohydric alcohol is isopropyl alcohol.

5. The printing apparatus as claimed in claim 1 wherein said water-soluble organic solvent is a polyhydric alcohol or derivative thereof.

6. The printing apparatus as claimed in claim 1 wherein said water-soluble organic solvent is selected from the group consisting of an aliphatic monohydric alcohol, a polyhydric alcohol, a derivative of the polyhydric alcohol and mixtures thereof.

7. The printing apparatus as claimed in claim 1 wherein the dilution liquid further comprises at least one of a surfactant, a viscosity adjustment agent, an anti-foaming agent, antiseptics and a pH adjustment agent.

8. The printing apparatus as claimed in claim 1 wherein metering of the ink or the dilution liquid is done by applying a pressure produced by deformation of a piezo-electric element on liquid reservoirs containing the ink and the dilution liquid for extruding the ink and the dilution liquid.

9. The printing apparatus as claimed in claim 1 wherein metering of the ink or the dilution liquid is done by heating the ink or the dilution liquid contained in a liquid reservoir and by applying pressure for extruding the ink or the dilution liquid.

10. The printing apparatus as claimed in claim 1 wherein the printing apparatus is on-demand.

11. A printing apparatus in which an ink and a dilution liquid are mixed together and a resulting mixed liquid is ejected onto a recording medium for recording, wherein:
   said dilution liquid contains a non-water-soluble organic solvent or a dispersion medium composed of water and a non-water-soluble resin, and said dilution liquid is dye free.

12. The printing apparatus as claimed in claim 11 wherein the dispersion medium contains a surfactant.

13. The printing apparatus as claimed in claim 11 wherein said non-water-soluble organic solvent is an aliphatic acid glycerin ester.

14. the printing apparatus as claimed in claim 11 wherein the amount of the non-water-soluble resin in the dilution liquid is 0.01 wt % to 50 wt %.

15. The printing apparatus as claimed in claim 11 wherein said non-water soluble resin in the dilution liquid is a resin containing an active OH-group.

16. The printing apparatus as claimed in claim 11 wherein said non-water-soluble resin in the dilution liquid is a resin rendered transparent after film formation on a recording medium and having a pencil hardness not less than B.

17. The printing apparatus as claimed in claim 11 wherein said dilution liquid further comprises a dispersion medium and a cross-linking agent inert in the dilution liquid.

18. The printing apparatus as claimed in claim 17 wherein said cross-linking agent is a dialdehyde, a derivative thereof or an isocyanate derivative having a protected reactive group.

19. The printing apparatus as claimed in claim 11 wherein said dilution liquid further comprises an UV absorber.

20. The printing apparatus as claimed in claim 11 wherein said dilution liquid further comprises a fluorescent whitening agent.

21. The printing apparatus as claimed in claim 11 wherein the ink contains an oily dye.

22. The printing apparatus as claimed in claim 11 wherein metering of the ink or the dilution liquid is done by applying a pressure produced by deformation of a piezo-electric element on a liquid reservoir containing the ink or the dilution liquid for extruding the ink or the dilution liquid.

23. The printing apparatus as claimed in claim 11 wherein metering of the ink or the dilution liquid is done by heating the ink or the dilution liquid contained in a liquid reservoir and by applying pressure for extruding the ink or the dilution liquid.

24. The printing apparatus as claim in claim 11 wherein the printing apparatus is on-demand.

25. A recording liquid used in a printing apparatus in which an ink and a dilution liquid are mixed together and a resulting mixed liquid is ejected onto a recording medium for recording, wherein:

said dilution liquid contains at least a water-soluble organic solvent and water;

said dilution liquid is dye free; and said water-soluble organic solvent is selected from the group consisting of lower alcohols, alcohol amines, ketones amides, ethers, alkylene glycols, polyalkylene glycols, and lower alkyl ethers of polyhydric alcohols, and glycerin.

26. The recording liquid as claimed in claim 25 wherein the amount of the water-soluble organic solvent in the dilution liquid is not less than 1 wt %.

27. The recording liquid as claimed in claim 26 wherein said water-soluble organic solvent is an aliphatic monohydric alcohol.

28. The recording liquid as claimed in claim 27 wherein said aliphatic monohydric alcohol is isopropyl alcohol.

29. The recording liquid as claimed in claim 26 wherein said water-soluble organic solvent is a polyhydric alcohol or derivative thereof.

30. The recording liquid as claimed in claim 25 wherein said water-soluble organic solvent is selected from the group consisting of an aliphatic monohydric alcohol, a polyhydric alcohol, a derivative of the polyhydric alcohol and mixtures thereof.

31. The recording liquid as claimed in claim 25 wherein the dilution liquid further comprises at least one of a surfactant, a viscosity adjustment agent, an anti-foaming agent, antiseptics and a pH adjustment agent.

32. A recording liquid employed in a printing apparatus in which an ink and a dilution liquid are mixed together and a resulting mixed liquid is ejected onto a recording medium for recording, wherein:

said dilution liquid contains a non-water-soluble organic solvent or a dispersion medium composed of water and a non-water-soluble resin, and said dilution liquid is dye free.

33. The recording liquid as claimed in claim 32 wherein the dispersion medium contains a surfactant.

34. The recording liquid as claimed in claim 3 wherein said non-water-soluble organic solvent is an aliphatic acid glycerin ester.

35. The recording liquid as claimed in claim 32 wherein the amount of the non-water-soluble resin in the dilution liquid is 0.01 wt % to 50 wt %.

36. The recording liquid as claimed in claim 32 wherein said non-water soluble resin in the dilution liquid is a resin containing an active OH-group.

37. The recording liquid as claimed in claim 32 wherein said non-water-soluble resin in the dilution liquid is a resin rendered transparent after film formation on a recording medium and having a pencil hardness not less than B.

38. The recording liquid as claimed in claim 32 wherein said dilution liquid further comprises a dispersion medium and a cross-linking agent inert in the dilution liquid.

39. The recording liquid as claimed in claim 38 wherein said cross-linking agent is a dialdehyde, a derivative thereof or an isocyanate derivative having protected reactive group.

40. The recording liquid as claimed in claim 32 wherein said dilution liquid further comprises an UV absorber.

41. The recording liquid as claimed in claim 32 wherein said dilution liquid further comprises a fluorescent whitening agent.

42. The recording liquid as claimed in claim 32 wherein the ink contains an oily dye.

43. A printing apparatus in which an ink and a dilution liquid are mixed together and a resulting mixed liquid is ejected onto a recording medium for recording wherein:

said dilution liquid contains aliphatic acid glycerin ester or a dispersion medium composed of water and a resin containing an active OH-group; and said dilution liquid is dye free.

44. A recording liquid used in a printing apparatus in which an ink and a dilution liquid are mixed together and a resulting mixed liquid is ejected onto a recording medium for recording, wherein:

said dilution liquid contains aliphatic acid glycerin ester or a dispersion medium composed of water and a resin containing an active OH-group; and said dilution liquid is dye free.

* * * * *